United States Patent
Clarke et al.

Patent No.: US 6,202,344 B1
Date of Patent: Mar. 20, 2001

(54) METHOD AND MACHINE FOR CHANGING AGRICULTURAL MULCH

(76) Inventors: Paul W. W. Clarke, Rte. 691, Greenwood, VA (US) 22943; Timothy M. Scruby, 8153 Dick Woods Rd., Afton, VA (US) 22920

(*) Notice: Subject to any disclaimer, the term of this patent is extended or adjusted under 35 U.S.C. 154(b) by 0 days.

(21) Appl. No.: 09/353,093

(22) Filed: Jul. 14, 1999

Related U.S. Application Data

(60) Provisional application No. 60/092,810, filed on Jul. 14, 1998.

(51) Int. Cl.$^7$ .................................................... A01G 7/00
(52) U.S. Cl. ........................................................ 47/9
(58) Field of Search .............................. 47/9, 58.1, 28.1

(56) References Cited

U.S. PATENT DOCUMENTS

| | | | |
|---|---|---|---|
| 1,930,939 | * 10/1933 | Horner | 47/28.1 |
| 3,580,196 | * 5/1971 | Lofgreen | 111/200 |
| 4,716,679 | * 1/1988 | Heard | 47/56 |
| 4,782,626 | * 11/1988 | Shanley et al. | 47/9 |
| 5,048,228 | * 9/1991 | Neveu et al. | 47/9 |
| 5,070,641 | * 12/1991 | Brockington | 47/9 |
| 5,077,935 | * 1/1992 | Stoever et al. | 47/9 |
| 5,163,247 | * 11/1992 | Weber et al. | 47/9 |

FOREIGN PATENT DOCUMENTS

| | | | |
|---|---|---|---|
| 402238824 | * 9/1990 | (JP) | 47/28.1 |
| 406046682 | * 2/1994 | (JP) | 47/28.1 |
| 406153711 | * 6/1994 | (JP) | 47/9 |

* cited by examiner

Primary Examiner—Michael J. Carone
Assistant Examiner—Son T. Nguyen
(74) Attorney, Agent, or Firm—Sheldon H. Parker

(57) ABSTRACT

A method and machine for changing or renewing the color and/or light reflection, transmission, and absorption characteristics of an existing layer of synthetic agricultural mulch or prolonging the usefulness of the existing mulch by applying a layer of new mulch to the pre-existing mulch in a cultivated field using heat welding/fusion or adhesive or mechanical fastening for attachment of new mulch to existing mulch and at least one blower for clearing debris from the existing mulch prior to application of new mulch, with the machine being able to be drawn by a tractor, laborer, or draft animal.

9 Claims, 4 Drawing Sheets

General Arrangement, Isometric View

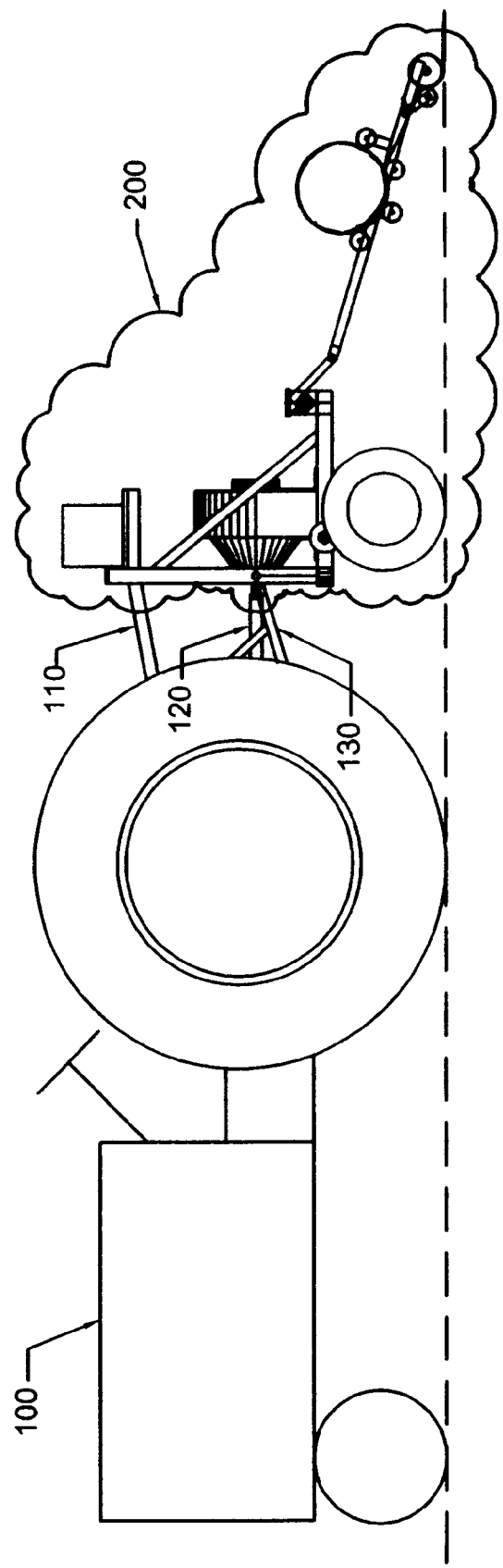
FIGURE 1 - General Arrangement, Side View

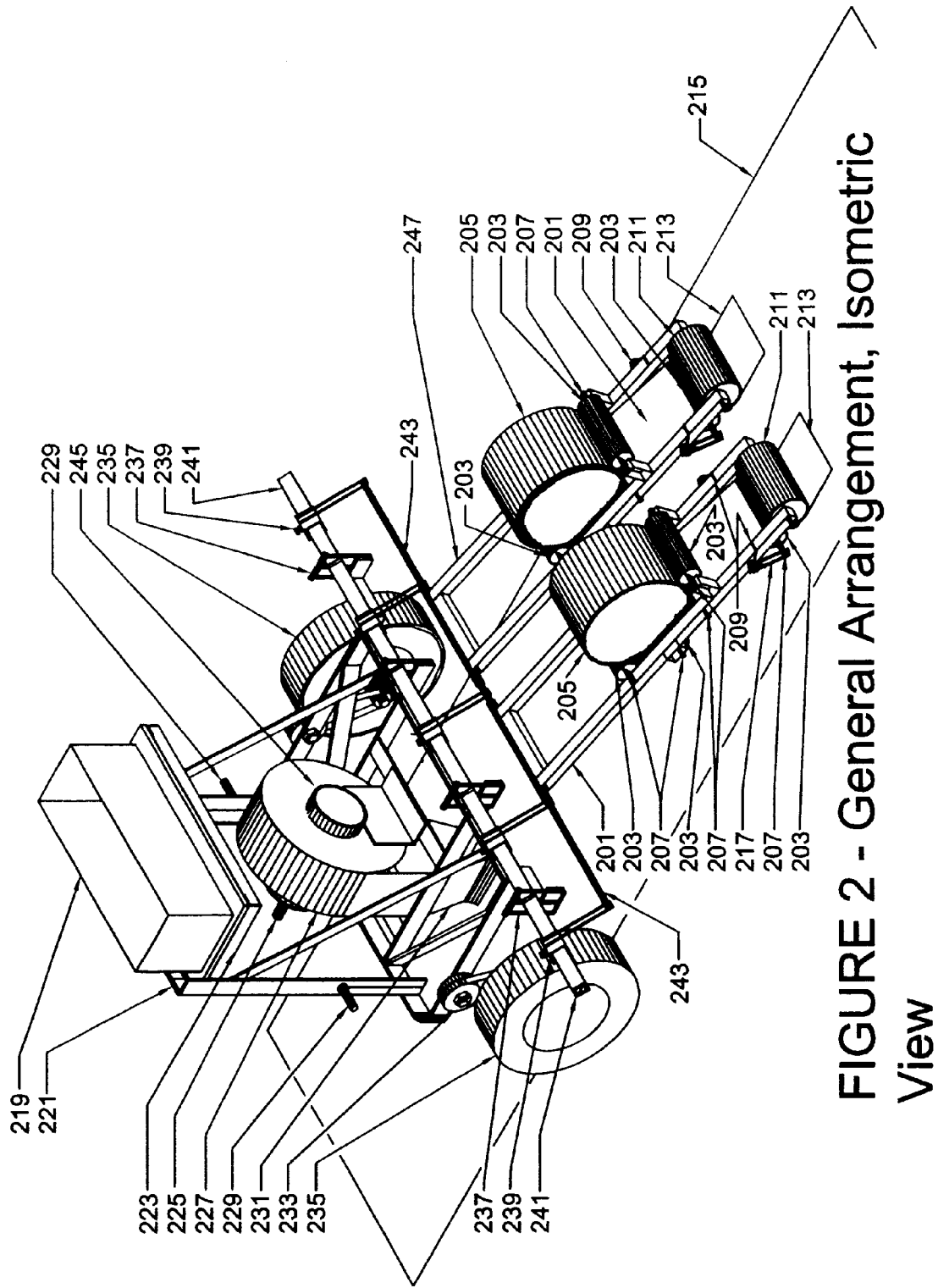
FIGURE 2 - General Arrangement, Isometric View

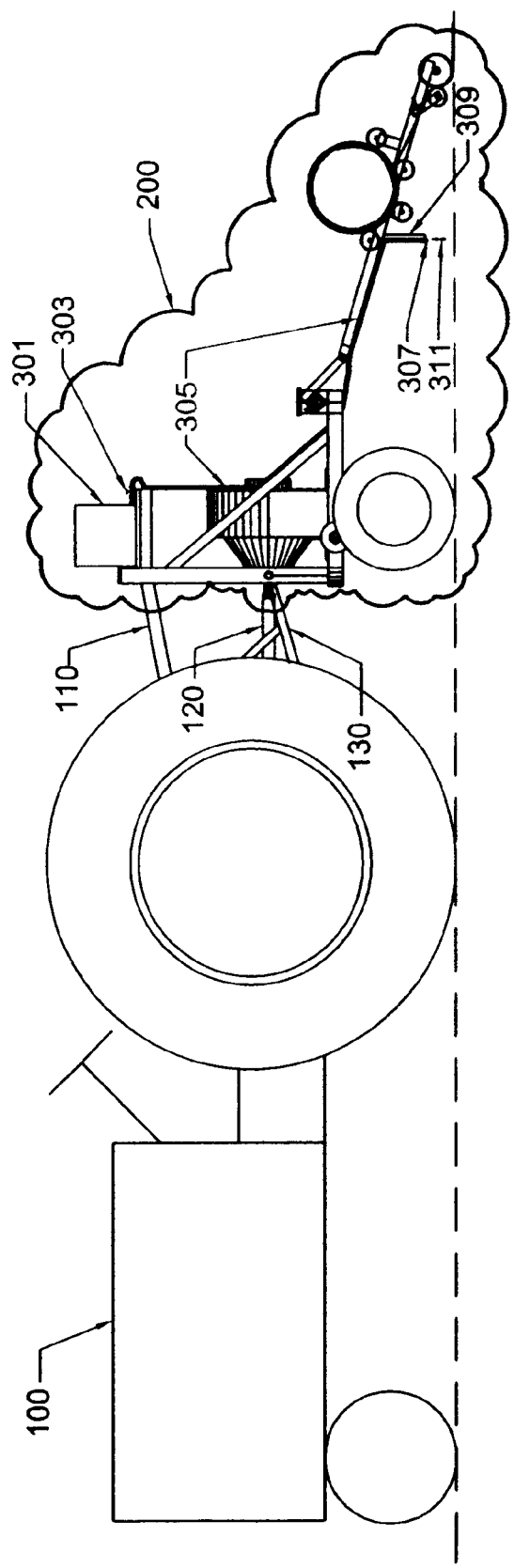
FIGURE 3 - Adhesive Method, Side View

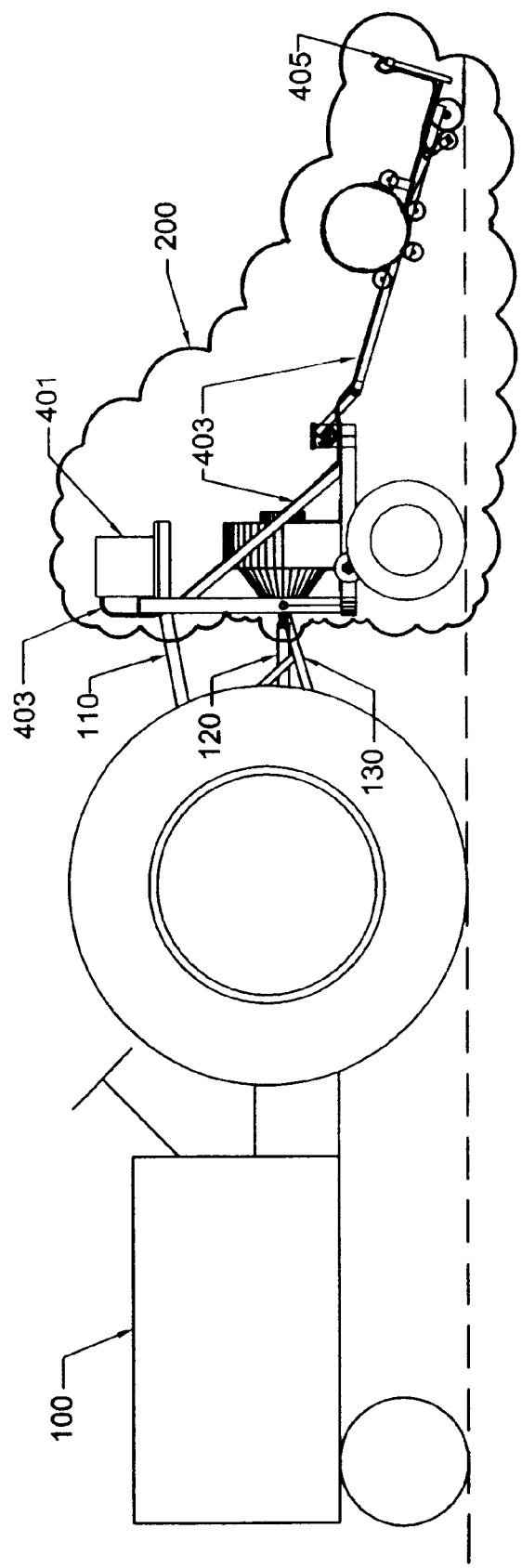
FIGURE 4 – Heat Weld Method, Side View

METHOD AND MACHINE FOR CHANGING AGRICULTURAL MULCH

CROSS-REFERENCE TO RELATED PATENT APPLICATION

This application claims the benefit of provisional patent application, Ser. No. 60/092,810 filed Jul. 14, 1998, for the Method and Machine for Changing Agricultural Mulch, the disclosure of which is incorporated herein by reference, as though recited in full.

FIELD OF INVENTION

This invention relates to agricultural mulch, specifically to a method and machine for changing or renewing the exposed surface of synthetic agricultural mulch in order to enhance agricultural quality and yield.

BRIEF DESCRIPTION OF THE PRIOR ART

Agricultural plastic film mulch is a layer of plastic film placed on the soil near or surrounding seeds or crops to enhance growth and yield. Farmers have long used a variety of mulches including straw and wood chips, biodegradable paper, and plastic film. Mulches in general can reduce weed growth by restricting light and oxygen, and protect seeds from foraging animals. Plastic film mulch is in widespread use in the truck farming and nursery industries and improves crop performance in a number of ways. It can help to maintain soil temperature at levels that are conducive to good seed germination and plant growth by absorbing sunlight and helping to trap heat in the soil. It can also aid in concentrating natural or applied moisture in seedbeds and near the roots of growing plants. Agricultural plastic mulch has been developed with a coating of reflective metal ("metalized plastic") that reflects sunlight onto the plant, vine, or tree, resulting in increased growth and yield.

Plastic films in widespread use for agricultural plastic film mulch are generally polyolefin family plastics (polyethylene, polypropylene, or polybutylene) of high or ultra-high molecular weight, commonly ranging in thickness from 0.5 to 6 mil thickness. Experience in use has shown that these films are usable for one to three seasons, depending on number of plantings, damage due to crop maintenance, traffic, UV degradation and the like. Removal of used film may be difficult, requiring extensive manual labor. Disposal of used film can also be costly due to traces of pesticides and fertilizer applied to the crops.

Recent research from major universities indicates that it is desirable to change the color and light absorption/reflective characteristics of the mulch film during the growing season to enhance plant growth, achieve better fruit color, change ripening characteristics, and reduce certain insect pests. U.S. Pat. Nos. 4,920,692, 5,138,792, 5,644,998, 5,729,929, and 5,846,661 describe various plastic films with special characteristics for use as agricultural mulch. For example, a particular variety of tomato may show better yield with red colored mulch than with other colors. A particular variety of beans may show best performance with yellow mulch. Certain insect pests and insect borne diseases may be significantly reduced with the application of metalized film mulch. Early growth in areas with shorter growing seasons may be improved by the use of black or transparent film mulch for maximum heat absorption. Later in the growing season, it may be desirable to change the color and light absorption characteristics of the initial mulch to those of a different plastic material such as metalized film to obtain the benefits of the color-reflective plastic mulch. In some climates, different crops with different mulch requirements may be planted in the same field in one growing season. Mulch selection is a compromise between the requirements of the two crops, or costly replacement must be performed during the middle of the season.

Prior art has not adequately addressed the need to change plastic film mulch color and light absorption characteristics. Renewal or changing color of existing film mulches is currently accomplished by removal and replacement. The problems with removal and replacement are that it results in an expense for removal and disposal, damages the plastic mulch so it cannot be reused, and potentially damages the crop itself. U.S. Pat. No. 5,452,652 (Thomas W. Brooks, Captiva, Fla., Sep. 26, 1995) describes a machine for removing and baling plastic mulch from agricultural fields. U.S. Pat. No. 4,796,711 (Ralph W. Chrysler, Alva, Fla., Jan. 10, 1989) describes a machine for removing plastic film from raised plant beds.

Two layer mulches have been used, with the top layer designed to disintegrate over time, exposing the bottom layer. Because of the many variables affecting degradation of the top layer and exposure of the bottom layer such as weather and durability of the top layer, proper control of the process has not been achieved. The farmer cannot control when the bottom layer will be exposed and the land is also littered with remnants of the deteriorated top layer. Various machinery for applying plastic film to furrows, earth surfaces and the like is described in U.S. Pat. Nos. 5,536,116, 4,888,913, 4,513,530, 4,285,161, and 3,559,599.

Yet another method used is to install one layer of plastic mulch and to coat its surface later with a liquid such as paint to produce a different color or reflective quality. The problem with this method, however, is that the key element of reflective plastic is its metalized surface, and such metalization cannot be done in the field. Therefore, this method also does not adequately address the problem of how to change the exposed surface of mulch. U.S. Pat. No. 4,932,156 describes a method for controlling the color of vegetable fiber mulch for retarding the fading and restoring the color of the mulch through spray application of a color control solution.

SUMMARY OF THE INVENTION

This invention is directed to the method and machine for applying one or more strips of plastic film to an existing agricultural plastic film mulch substrate that can be attached to a standard farm tractor or drawn by a man or animal. The object of the invention is to provide a method and machine that easily allows the user to attach the new agricultural plastic film to the existing mulch in locations and configurations that are user adjustable to accommodate varying field conditions and crop requirements to accomplish a change in color and light absorption characteristics, and renewal of the structural integrity of the plastic film substrate through the added integrity of the applied film layer. This invention can also be drawn behind an agricultural plastic mulch laying machine to laminate plastic to the new mulch at the time the mulch is laid to construct a multi-colored, multi-characteristic mulch installation.

The field-laminating machine consists of a 3-point hitch mounted carrier frame with height adjustable wheels carrying a tool bar upon which are mounted one or more laminator assemblies. The frame also carries a radial blade pressure blower driven from tractor. The blower provides a pressurized air supply to high velocity outlet nozzles attached to the frame for the purpose of removing soil and other debris from the surface of the plastic mulch.

The laminator assembly consists of the film stock roll carrier, one or more guide rolls, and a press roll. The film stock roll carrier is used to hold the roll of film stock, and to allow its free rotation and unwinding. The guide rolls direct the film web to the press roll at the desired angle of application. The press roll rolls along the surface of the ground on top of the film layer being applied and exerts pressure on both new and existing layers of film. The laminator assembly is designed to be removable from the carrier frame so that an agricultural worker or draft animal can draw it where conditions preclude the use of a tractor.

The machine is adaptable to allow the use of adhesive, heat welding/fusing or mechanical fastening to secure the lamination. The machine and method can be used with any flexible plastic film that can be attached to another film by mechanical, adhesive or heat welding fastening technique, including, but not limited to: polyolefin in general, as well as, specifically polyethylene, polypropylene, and polybutylene; polyvinyl chloride (PVC); chlorinated polyvinyl chloride (CPVC), acrylo-nitrile butadiene styrene (ABS). This film can be produced by known film making processes, such as extrusion, blown tubing, and spun-bonding.

Accordingly, the invention addresses and overcomes the problems posed by the prior art. The invention provides an effective, convenient, and economical method of changing the exposed surface of mulch. Specifically, the invention has several objects and advantages.

First, the invention avoids the need to remove the existing layer of mulch in order to accomplish a change in color or light absorption/reflection. This provides the advantages of saving time, effort, and expense in the removal and disposal of the mulch. It also avoids potential damage to crops as a result of removal.

Second, the invention allows for complete control over when the exposed surface of the mulch is changed. This provides the advantage of using the correct color and reflective quality at the proper time instead of simply relying on unpredictable and uneven degradation of a top layer in a two-layer system.

Third, the invention avoids the problem of degradation of a layer of plastic mulch. This provides the advantage of not having remnants of the top layer strewn about the land.

Fourth, the invention allows for the newly exposed surface to be a metalized, rather than painted, surface. This provides the advantage of having an ideal reflective surface to promote crop quality and yield.

Fifth, the invention allows for the extension of the useful life of a partially degraded mulch by the addition of new material to structurally reinforce the existing material. This provides the advantage of saving time, effort, and expense of removal of the old layer.

Sixth, the invention allows for the application of a second layer of mulch by heat-weld, adhesive, or mechanical fastening. This provides the advantage of allowing the use of whichever method best meets the needs of the particular application.

Seventh, the invention provides a method of attaching a second layer of mulch to an existing layer of mulch that can be accomplished by one person. This provides the advantage of greater labor efficiency.

Eighth, the invention provides the ability to be drawn behind a standard mulch laying machine. This provides the advantage of allowing initial application of a second layer, which is desirable where the farmer wishes to expose the bottom layer by later removing the second layer.

BRIEF DESCRIPTION OF THE DRAWINGS

FIG. 1 shows a side view of the invention connected to farm tractor, as it would appear operation.

FIG. 2 shows an isometric view of the machine with all common parts.

FIG. 3 shows a side view of the invention connected to farm tractor, as it would appear in operation with elements of the adhesive attachment system identified.

FIG. 4 shows a side view of the invention connected to farm tractor, as it would appear in operation with elements of the heat weld/fusing or mechanical fastening system identified.

REFERENCE NUMBERS IN THE DRAWINGS
Part Number Description
100 Farm Tractor
110 3-Point Hitch Top Arm
120 Power Take-Off Universal Shaft
130 3-Point Hitch Bottom Arm
200 Field Plastic Laminating Machine
201 Plastic Film Web
203 Guide Roll
205 Plastic Film Mulch Roll Stock
207 Roll Shaft
209 Idler Arm Spring
211 Press Roll
213 Plastic Film Stock (in place on substrate)
215 Plastic Film Substrate
217 Idler Arm
219 Attachment System Enclosure
221 Carrier Frame
223 Attachment System Enclosure Platform
225 Pressure Blower Input Shaft
227 Pressure Blower
229 Hitch Pin
231 Pressure Blower Outlet Nozzle
233 Adjustable Height Wheel Mount
235 Rubber Tire, Rim and Axle (Wheel)
237 Toolbar Mount
239 Adjustable Toolbar Clamp
241 Toolbar
243 Carrier Swivel Rod
245 Pressure Blower Inlet
247 Roll Stock Carrier Frame
301 Adhesive Reservoir
303 Needle Valve
305 Adhesive Delivery Tubing
307 Adhesive Outlet
309 Tube Support Bracket
311 Adhesive
401 Utility Supply Unit
403 Hose/Cable Assembly
405 Attachment Head

DETAILED DESCRIPTION OF THE PREFERRED EMBODIMENTS OF THE INVENTION

FIG. 1 illustrates the Field Plastic Laminating Machine 200 attached to a farm tractor 100 using the 3-point hitch top arm 110 and the 3-point hitch bottom arms 130. The blower drive (either tractor hydraulic or tractor power take-off) is connected to the tractor. FIG. 1 illustrates the connection of a power take-off universal shaft 120 to the pressure blower input shaft 225.

The significant machine components illustrated in FIG. 2 are: the carrier frame 221 which is an industry standard welded fabrication of hot rolled structural steel shapes and forged steel hitch pins 229 with rubber tire, rim and axle 235 mounted on an adjustable height wheel mount 233; the toolbar 241 that is attached to the carrier frame by mounts 237; the carrier swivel rod 243 attached to the toolbar 241 by adjustable toolbar clamps 239; the pressure blower 227, attached pressure blower outlet nozzle 231 and attached pressure blower inlet 245; and the film roll stock carrier frame attached to the carrier swivel rod consisting of steel tube frame supporting idler arms 217 and idler arm springs 209 and guide rolls 203 and press roll 211 on shafts 207. The attachment system enclosure platform 223 is attached to the carrier frame 221 and supports the attachment system enclosure 219.

The plastic film mulch roll stock 205 is manually put into place by the operator. The operator manually threads the plastic film web through the guide rolls 203 and under the press roll 211.

For use with adhesive attachment method as illustrated in FIG. 3, the operator fills the adhesive reservoir 301 and turns on adhesive supply to the applicator system by opening needle valve 303. For use with heat welding attachment, the operator energizes the heat welder power supply.

The operator uses the tractor to draw the machine along the row. As illustrated in FIG. 2, pressure blower 227 discharges air at high velocity through the pressure blower outlet nozzle 231 to clear debris from plastic film substrate 215. Friction between the plastic film web 201 and the plastic film substrate 215 created by the pressure exerted by the press roll 211 creates the tension required to draw the film web 201 through the guide rolls 203 and unwind the stock from the roll 205. Adhesive attachment, heat welding/fusion, or mechanical fastening provided by the machine (or separate mechanical attachment not part of machine) secures the new plastic film to the substrate. When the machine reaches the end of the row, the tractor is stopped and the plastic film web is cut by the operator. For the adhesive attachment method, the operator turns off adhesive supply from the reservoir to the applicator system. For the heat welding/fusion method, the operator de-energizes the heat fusion system power supply. The operator then uses the tractor hydraulic lift the machine until the press roll is not touching the ground and uses the tractor to move the machine to the next row where the process is repeated.

For adhesive attachment method as illustrated in FIG. 3, adhesive stored in reservoir 301 is metered into adhesive delivery tubing 305 by adjustment of needle valve 303. Adhesive 311 flows through the tubing to the adhesive outlet 307, supported by the tube support bracket 309, in front of press roll 211 where it drops onto the film substrate 215. The press roll 211 presses the new plastic film web 201 onto the substrate 215 and adhesive 311, creating a bond between the two film layers.

FIG. 4 illustrates both the heat welding/fusion attachment method and the mechanical fastening method. For heat welding/fusion, the utility supply unit 401 contains fuel or electrical supply and pressurized air supply that is conveyed to attachment head 405 by hose/cable assembly 403. For mechanical fastening, the utility supply unit 401 contains mechanical attachment objects such as stakes, staples, rivets, or other objects that in one invention could be conveyed to attachment head 405 by hose/cable assembly 403 or in another invention could be conveyed by the operator as needed to the attachment head 405 without the need for hose/cable assembly 403 (for instance, conveying staples from storage in utility supply unit 401 to the stapler device constituting attachment head 405).

What is claimed is:

1. A method of changing the color and/or light absorption, reflection or transmission properties of a layer of synthetic agricultural mulch lying on the ground or restoring the structural properties of said layer comprising the step of laying and securing onto said layer of mulch another layer of synthetic agricultural mulch of similar or different color and/or light absorbing, reflecting, or transmitting properties.

2. The method of claim 1 wherein said securing is accomplished by adhesive attachment of the two layers to each other.

3. The method of claim 2 wherein said adhesive attachment is accomplished by gluing the two layers to each other.

4. The method of claim 1 wherein said securing is accomplished by heat welding/fusing the two layers to each other.

5. The method of claim 4 wherein said heat welding/fusing uses a fired gaseous fuel heat source.

6. The method of claim 4 wherein said heat welding/fusing uses an electric resistance heat source.

7. The method of claim 1 wherein said securing is accomplished by mechanical fastening.

8. The method of claim 7 wherein said mechanical fastening is accomplished by driving stakes, staples, rivets, or other objects through at least the uppermost of said two layers.

9. The method of claim 1, wherein the step of laying and securing onto said layer of mulch another layer of synthetic agricultural mulch of similar or different color and/or light absorbing, reflecting, or transmitting properties, comprises the step of laying and securing onto said layer of mulch another layer of synthetic agricultural mulch of different color and/or light absorbing, reflecting, or transmitting properties, as compared to the underlying layer.

* * * * *